United States Patent
Shenfield et al.

(10) Patent No.: US 7,555,538 B2
(45) Date of Patent: Jun. 30, 2009

(54) SYSTEM AND METHOD FOR BUILDING AND EXECUTION OF PLATFORM-NEUTRAL GENERIC SERVICES' CLIENT APPLICATIONS

(75) Inventors: Michael Shenfield, Richmond Hill (CA); Viera Bibr, Kilbride (CA); Brindusa L. Fritsch, Toronto (CA); Bryan R. Goring, Milton (CA); Robert Kline, Richmond Hill (CA); Kamen B. Vitanov, Toronto (CA)

(73) Assignee: Research in Motion Limited, Waterloo, Ontario (CA)

( * ) Notice: Subject to any disclaimer, the term of this patent is extended or adjusted under 35 U.S.C. 154(b) by 739 days.

(21) Appl. No.: 10/745,120

(22) Filed: Dec. 23, 2003

(65) Prior Publication Data

US 2004/0215700 A1    Oct. 28, 2004

Related U.S. Application Data

(60) Provisional application No. 60/503,665, filed on Sep. 17, 2003, provisional application No. 60/436,011, filed on Dec. 26, 2002.

(51) Int. Cl.
G06F 15/16 (2006.01)
(52) U.S. Cl. .................................................. 709/219
(58) Field of Classification Search ......... 709/217–219, 709/227–229; 717/114–118, 168–178
See application file for complete search history.

(56) References Cited

U.S. PATENT DOCUMENTS

| | | | | |
|---|---|---|---|---|
| 6,083,279 | A * | 7/2000 | Cuomo et al. ............... | 717/118 |
| 6,426,798 | B1 * | 7/2002 | Yeung ........................ | 358/1.13 |
| 6,496,979 | B1 * | 12/2002 | Chen et al. ................... | 717/178 |
| 6,691,234 | B1 | 2/2004 | Huff | |
| 6,735,294 | B2 * | 5/2004 | Creamer et al. ........ | 379/211.02 |
| 6,757,710 | B2 * | 6/2004 | Reed .......................... | 709/217 |
| 6,772,413 | B2 * | 8/2004 | Kuznetsov .................. | 709/231 |
| 7,152,090 | B2 | 12/2006 | Amirisetty et al. | |

(Continued)

FOREIGN PATENT DOCUMENTS

WO    WO 00/36803    6/2000

(Continued)

OTHER PUBLICATIONS

Cramer T et al: "Compiling Java Just in Time" IEEE Micro, IEEE Inc. New York, US, vol. 17, No. 3, May 1, 1997, pp. 36-43, XP000656035 ISSN: 0272-1732 the whole document.

(Continued)

*Primary Examiner*—Jeffrey Pwu
*Assistant Examiner*—Benjamin R Bruckart
(74) *Attorney, Agent, or Firm*—Gowling, Lafleur Henderson; Kevin Pillay; Mark Sprigings

(57) ABSTRACT

A system and method of building component applications are provided. Component applications are executed on terminal devices, which communicate with a schema-based service via a network and the Internet. The component applications comprise data components, presentation components, and message components, which are written a structured definition language such as XML code. The component applications further comprise workflow components which can be written as a series of instructions such as in a subset of ECMAScript, and are embedded in the XML code.

55 Claims, 11 Drawing Sheets

U.S. PATENT DOCUMENTS

| | | | |
|---|---|---|---|
| 7,240,327 B2 * | 7/2007 | Singh et al. | 717/108 |
| 7,472,349 B1 * | 12/2008 | Srivastava et al. | 709/230 |
| 7,475,000 B2 | 1/2009 | Cook et al. | |
| 2002/0024536 A1 | 2/2002 | Kahan et al. | |
| 2002/0120685 A1 * | 8/2002 | Srivastava et al. | 709/203 |
| 2003/0037311 A1 * | 2/2003 | Busfield | 717/115 |
| 2003/0237050 A1 * | 12/2003 | Davidov et al. | 715/513 |
| 2005/0138650 A1 * | 6/2005 | Hon et al. | 719/330 |
| 2006/0161863 A1 * | 7/2006 | Gallo | 715/810 |

FOREIGN PATENT DOCUMENTS

| | | |
|---|---|---|
| WO | WO01/86439 | 11/2001 |
| WO | WO 01/86439 A2 | 11/2001 |
| WO | WO 02102093 A1 | 12/2002 |

OTHER PUBLICATIONS

Cannataro M et al: "A component-based architecture for the development and deployment of WAP-compliant transactional services" IEEE Micro, Jan. 3, 2001, pp. 2753-2762, XP010549912 abstract p. 1, col. 2, line 4—p. 3, col. 2, line 30 p. 7, col. 1, line 45—p. 8, col. 2, line 45.

"PCT International Search Report and Written Opinion" for PCT International Application No. PCT/CA 03/01976 filed on Dec. 24, 2003, Nov. 23, 2004, 4 pages, International Searching Authority.

"PCT Written Opinion" for PCT International Application No. PCT/CA 03/01976 filed on Dec. 24, 2003, Mar. 4, 2005, 6 pages, International Preliminary Examining Authority.

"PCT Notification of Transmittal of the International Preliminary Examination Report" for PCT International Application No. PCT/CA 03/01976 filed on Dec. 24, 2003, Aug. 1, 2005, 7 pages, International Preliminary Examining Authority.

"European Examination Report" for European Patent Application No. 03767363.9, Dec. 7, 2005, 6 pages, 1082-0279, European Patent Office.

Englsh Translation of "Detailed First Office Action" for corresponding Chinese Patent Application No. 200380109992.1, Jun. 8, 2007, 4 pages, China Intellectual Property Office.

* cited by examiner

SYSTEM AND METHOD FOR BUILDING AND EXECUTION OF PLATFORM-NEUTRAL GENERIC SERVICES' CLIENT APPLICATIONS

This application claims the benefit of U.S. provisional 60/436,011, filed Dec. 26, 2002, the entire disclosure of which is herein incorporated by reference, and further claims the benefit of US provisional 60/503,665, filed Sep. 17, 2003, the entire disclosure of which is herein incorporated by reference.

BACKGROUND

This application relates generally to communication of services over a network to a device.

There is a continually increasing number of terminal devices in use today, such as mobile telephones, PDAs with wireless communication capabilities, personal computers, self service kiosks and two-way pagers. Software applications which run on these devices increase their utility. For example, a mobile phone may include an application which retrieves the weather for a range of cities, or a PDA may include an application that allows a user to shop for groceries. These software applications take advantage of the connectivity to a network in order to provide timely and useful services to users. However, due to the restricted resources of some devices, and the complexity of delivering large amounts of data to the devices, developing software applications for a variety of devices remains a difficult and time-consuming task.

Currently, devices are configured to communicate with Web Services through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Native applications have the advantage of being developed specifically for the type of device platform, thereby providing a relatively optimized application program for each runtime environment. However, native applications have disadvantages of not being platform independent, thereby necessitating the development multiple versions of the same application, as well as being relatively large in size, thereby taxing the memory resources of the device. Further, application developers need experience with programming languages such as Java and C++ to construct these hard coded native applications. There is a need for application programs that can be run on client devices having a wide variety of runtime environments, as well as having a reduced consumption of device resources.

The systems and methods disclosed herein provide a component based application environment to obviate or mitigate at least some of the above presented disadvantages.

SUMMARY

Current application programs are not adaptable to be run on clients having a wide variety of runtime environments, and can undesirably consume too much of device resources. Browsers are an application program that have a disadvantage of requesting pages (screen definitions in HTML) from a Web Service, which hinders the persistence of data contained in the screens. A further disadvantage of Browsers is that the screens are rendered at runtime, which can be resource intensive. Native applications are a further example of current application programs which have disadvantages of not being platform independent, thereby necessitating the development multiple versions of the same application, as well as being relatively large in size, thereby taxing the memory resources of the device. Contrary to current application programs, a system of building and executing platform neutral generic schema defined services through component applications is provided. The system comprises component applications which execute on the devices, which communicate with network service via a network such as the Internet. The component applications comprise one or more data components, presentation components, and/or message components, which are written in a structured definition language such as XML code. The component applications can further comprise workflow components which contain a series of instructions such as written in a subset of ECMAScript, and, in certain implementations, can be embedded in the XML code. A method of building component applications is also provided. The method comprises steps of creating data components, creating presentation components, and creating message components. The data, presentation, and message components can be written in a structured definition language such as XML. The method further comprises tying together the data, presentation, and message components with workflow components written in a scripting language such as ECMAScript or a subset of ECMAScript.

A method of interacting with a schema-defined service by a terminal device over a network is provided herein. The method comprises the steps of: receiving a request network message for establishing communication between the service and the device; sending in response to the request network message a component application program including a plurality of components, a first set of the components having descriptors expressed in a structured definition language and a second set of the components being expressed as a series of instructions, the components being configured for provisioning by a runtime environment of the device to produce an executable version of the component application program configuring the device as a client of the service; wherein execution of the executable version provides for a subsequent exchange of information over the network between the service and the device.

A terminal device configured for interacting over a network with a schema based service using an executable version of a component application program including a plurality of components is further disclosed. The device comprises; a device infrastructure for operating the device including a processor and an associated memory for executing the executable version; a user interface coupled to the device infrastructure having an input device and an output device configured for communication with the executable version; a network connection interface coupled to the device infrastructure and configured for communicating with the network; and a runtime environment for coordinating execution of the executable version for configuring the device as a client of the service, the runtime environment configured for interaction with a first set of the components having descriptors expressed in a structured definition language and a second set of the components being expressed as a series of instructions; wherein the execution of the executable version provides for a subsequent exchange of information over the network between the service and the device.

A computer program product for configuring a terminal device for interacting over a network with a schema-based service using an executable version of a component application including a plurality of components is also provided. The computer program product comprises: a computer readable medium; a runtime environment module stored on the computer readable medium for coordinating execution of the executable version for configuring the device as a client of the service, the runtime environment configured for interaction with a first set of the components having descriptors expressed in a structured definition language and a second set of the components being expressed as a series of instructions; wherein the execution of the executable version provides for a subsequent exchange of information over the network between the service and the device.

In addition, a server configured for providing a schema-based service for interacting with a terminal device over a network is disclosed. The server comprises: a network interface for receiving a request network message to establish communication between the service and the device; a component application program coupled to the network interface for sending in response to the request network message, the component application program including a plurality of components, a first set of the components having descriptors expressed in a structured definition language and a second set of the components being expressed as a series of instructions, the components being configured for provisioning by a runtime environment of the device to produce an executable version of the component application program configuring the device as a client of the service; wherein execution of the executable version provides for a subsequent exchange of information over the network between the service and the device.

A terminal device configured for interacting over a network with a schema-based service using an executable version of a component application program including a plurality of components is also disclosed. The device comprises; an infrastructure means for operating the device to execute the executable version; a user interface means coupled to the infrastructure means configured for communication with the executable version; a network interface coupled to the device infrastructure and configured for communicating with the network; and a runtime means for coordinating execution of the executable version for configuring the device as a client of the service, the runtime means configured for interaction with a first set of the components having descriptors expressed in a structured definition language and a second set of the components being expressed as a series of instructions; wherein the execution of the executable version provides for a subsequent exchange of information over the network between the service and the device.

BRIEF DESCRIPTION OF THE DRAWINGS

These and other features will become more apparent in the following detailed description in which reference is made to the appended drawings wherein.

DESCRIPTION

Network System

Figure 1:
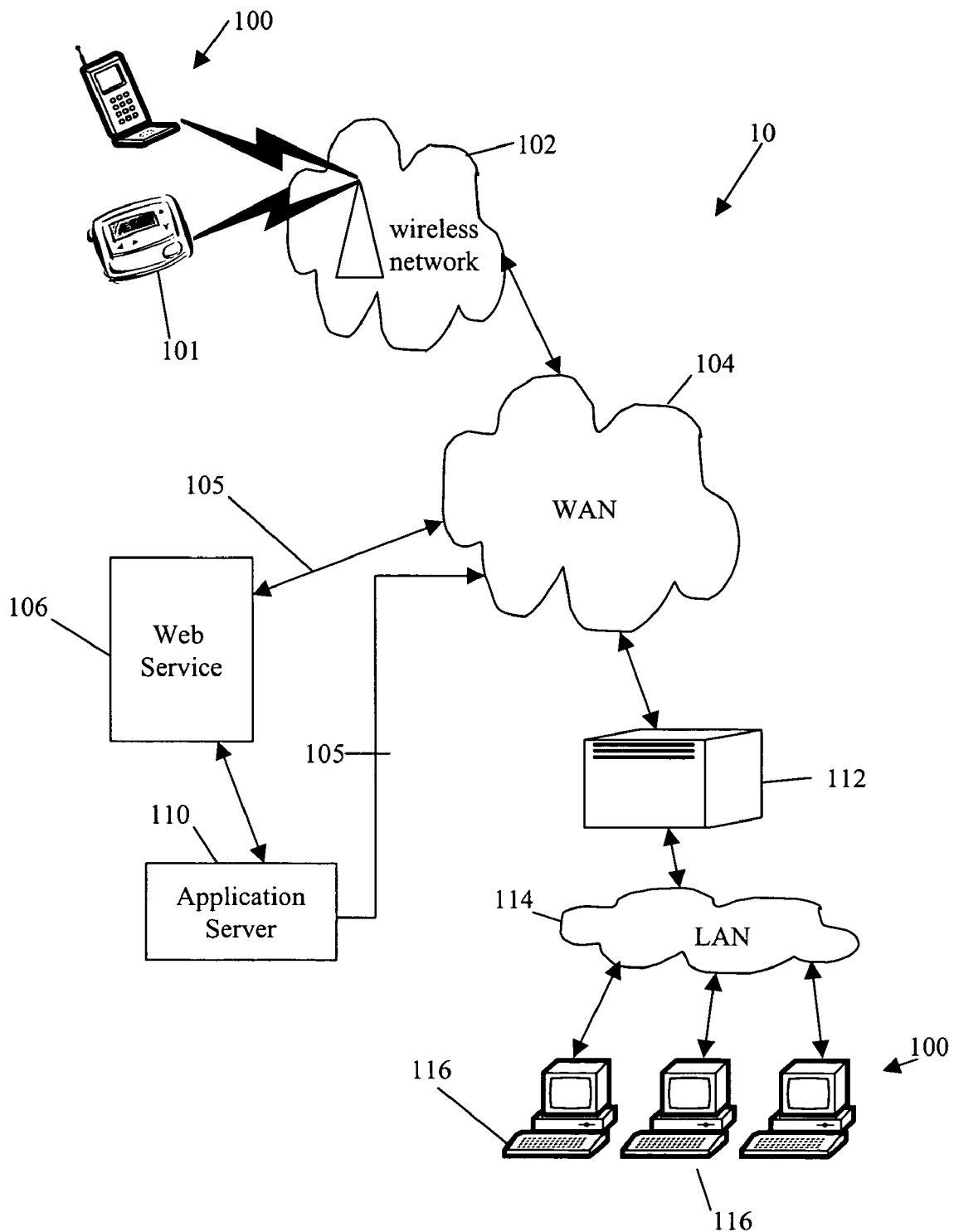
FIG. 1 is a block diagram of a network system.

Referring to FIG. 1, a network system 10 comprises a plurality of generic terminal devices 100 for interacting with one or more generic schema defined services provided by a network server 106, via a coupled Wide Area Network (WAN) 104 such as but not limited to the Internet. These generic terminal devices 100 can be such as but not limited to personal computers 116, wireless devices 101, PDAs, self-service kiosks and the like. The generic services provided by the server 106 can be Web Services and/or other services such as but not limited to SQL Databases, IDL-based CORBA and RMI/IIOP systems, Legacy Databases, J2EE, SAP RFCs, and COM/DCOM components. Further, the system 10 can also have a gateway server 112 for connecting the desktop terminals 116 via a Local Area Network (LAN) 114 to the server 106. Further, the system 10 an also have a wireless network 102 for connecting the wireless devices 101 to the WAN 104. It is recognized that other devices and computers (not shown) could be connected to the web server 106 via the WAN 104 and associated networks other than as shown in FIG. 1. The generic terminal devices 100, wireless devices 101 and personal computers 116 are hereafter referred to as the devices 100 for the sake of simplicity. Web services are selected for the following description of the system 10, for the sake of simplicity. However, it is recognized that other generic schema defined services could be substituted for the web services, if desired. Further, the networks 102, 104, 112 of the system 10 will hereafter be referred to as the network 104, for the sake of simplicity.

Referring again to FIG. 1, the devices 100 transmit and receive requests/response messages 105, respectively, when in communication with the web services of the server 106. The devices 100 can operate as web clients of the web services by using the requests/response messages 105 in the form of message header information and associated data content, for example requesting and receiving product pricing and availability from an on-line merchant. The web service is an example of a system with which client application programs 302 (see FIG. 2) on the communication devices 100 interact via the wireless network 104 in order to provide utility to users of the communication devices 100. The messages 105 sent between the communication devices 100 and the web service could traverse a message-map service (not shown) which converts the messages 105 between the differing formats used by the devices 100 and the web service.

For satisfying the appropriate requests/response messages 105, the web server 106 can communicate with an application server 110 through various protocols (such as but not limited to HTTP and component API) for exposing relevant business logic (methods) to client application programs 302 (see FIG. 2) once provisioned on the devices 100. The application server 110 can also contain the web server 106 software, such that the web server 106 can be considered a subset of the application server 110. The application programs 302 of the device 100 can use the business logic of the application server 110 similarly to calling a method on an object (or a function). It is recognized that the client application program 302 can be downloaded/uploaded in relation to the application server 110, through the messages 105 via the network 104, directly to the devices 100. It is further recognized that the devices 100 can communicate with one or more web servers 106 and associated application servers 110 via the networks 104. It is also recognized that the devices 100 could be directly coupled to the application servers 110, thereby bypassing the web servers 106, if desired.

Server Environment

Referring to FIG. 1, the web server 106 provides information messages 105 which are used by the client application programs 302 (see FIG. 2) on the devices 100. Alternatively, or in addition, the web server 106 may receive and use the information messages 105 provided by the client application programs 302 executed on the devices 100, or perform tasks on behalf of client application programs 302 executed on the devices 100. The web service can be defined as a software service of the web server 106, which can implement an interface such as expressed using Web Services Description Language (WSDL) registered in Universal Discovery Description and Integration (UDDI) in a web services registry, and can communicate through messages 105 with client devices 100 by being exposed over the network 104 through an appropriate protocol such as the Simple Object Access Protocol (SOAP). In some implementations, SOAP is a specification that defines the XML format for the messages 105, including a well-formed XML fragment enclosed in SOAP elements. Other parts of SOAP specify how to represent program data as XML and how to use SOAP to do Remote Procedure Calls (RPC). These optional parts of SOAP are used to implement RPC-style applications where a SOAP request message 105 containing a callable function, and the parameters to pass to the function, is sent from the client device 100, and the server 106 returns the response message 105 with the results of the executed function. SOAP also supports document style applications where the SOAP message 105 is a wrapper around an XML document. A further optional part of SOAP defines the HTTP binding (i.e. header), whereas some SOAP implementations support MSMQ, MQ Series, SMTP, or TCP/IP transport protocols. Alternatively, the web service may use other known communication protocols, message 105 formats, and the interface may be expressed in other web services languages than described above.

In general, web services come as a replacement for legacy Browser-based and Client-Server TCP/IP connected infrastructure and applications. Originally started as a generic machine-to-machine (M2M) communication protocol, web services are becoming a standard for any service-to-service (S2S) or service to consumer (S2C) communications. Based on a set of standard protocols (e.g. WSDL, SOAP, UDDI), web services can provide a platform neutral communication pipe, for example XML-based, that can support synchronous and/or asynchronous communication messages 105. The system 10 of FIG. 1 relates preferably to the S2C model and deals with the consumer of the web service operating from some generic terminal device 100. Accordingly, the services supplied by the server 106 are utilized by the user of the devices 100 over the network 104.

Client Environment

Figure 2:
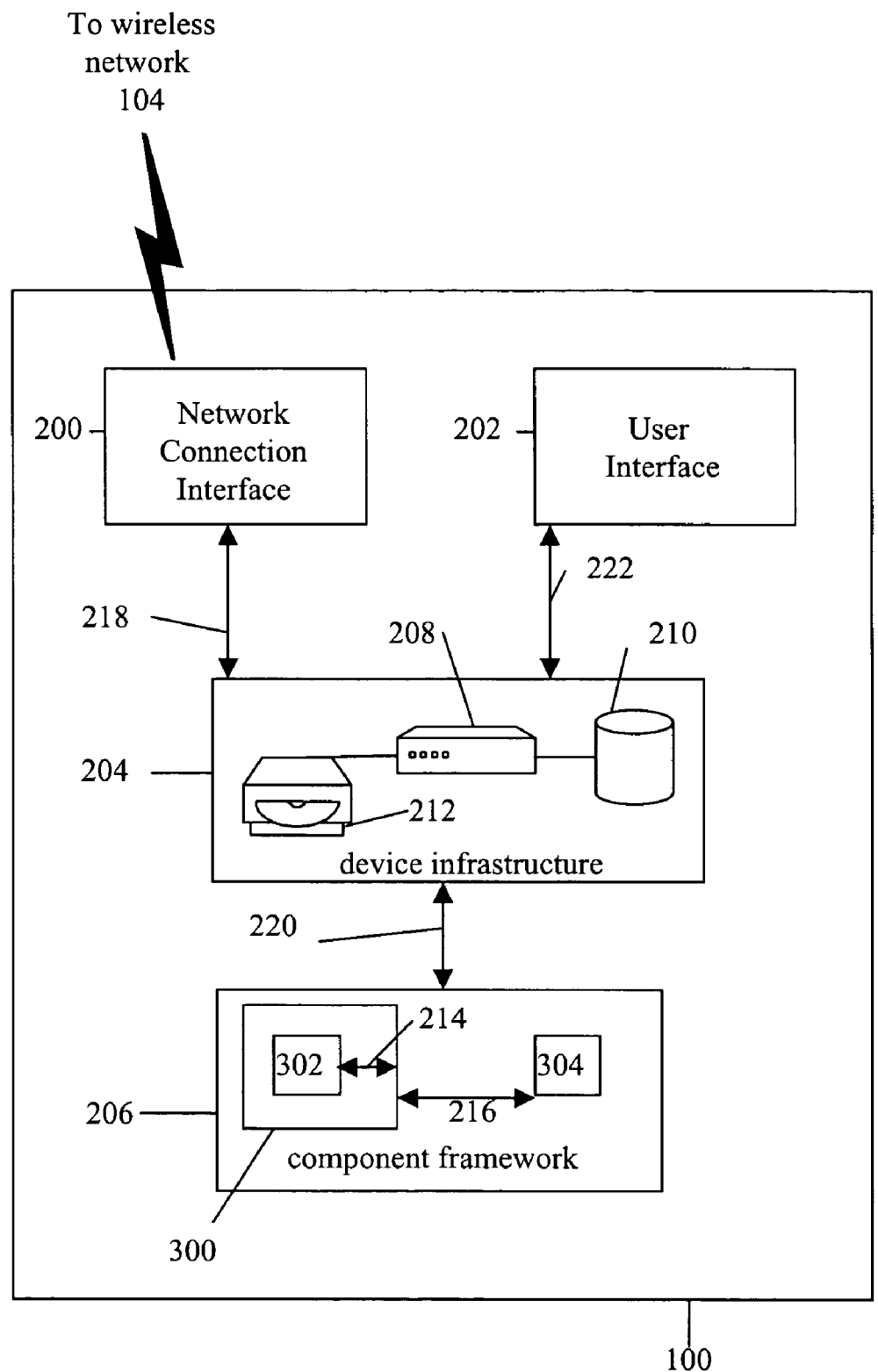
FIG. 2 is a block diagram of a generic terminal device of FIG. 1.

Referring to FIG. 2, the component applications 302 are transmitted via the network 104 and loaded into a memory module 210 of a device infrastructure 204 of the device 100. Alternatively, the component applications 302 may be loaded via a serial connection, a USB connections, or a short-range wireless communication system such as IR, 802.11(x) BluetoothTM (not shown). Once loaded onto the device 100, the component applications 302 can be executed by a component framework 206 on the device 100, which converts the component applications 302 into native code, which is executed by a processor 208 in the device infrastructure 204. Alternatively, the component applications 302 may be executed as native code or interpreted by another software module or operating system on the device 100. In any event, the component applications 302 are run in a terminal runtime environment provided by the device 100.

Referring again to FIG. 1, the client runtime environment provided by the devices 100 can be configured to make the devices 100 operate as web clients of the web services (of the web server 106). It is recognized that the client runtime environment can also make the devices 100 clients of any other generic schema-defined services supplied by the server 106. The client runtime environment of the devices 100 is preferably capable of generating, hosting and executing the client application programs 302 (which are in the form of component applications—see FIG. 4 and description herein below) on the device 100. Further, specific functions of the client runtime environment can include such as but not limited to support for language, coordinating memory allocation, networking, management of data during I/O operations, coordinating graphics on an output device of the devices 100 and providing access to core object oriented classes and supporting files/libraries. Examples of the runtime environments implemented by the devices 100 can include such as but not limited to Common Language Runtime (CLR) by Microsoft and Java Runtime Environment (JRE) by Sun Microsystems.

The terminal runtime environment of the devices 100 preferably supports the following basic functions for the resident executable versions of the client application programs 302 (see FIG. 2), such as but not limited to:

provide a communications capability to send messages 105 to the Web Services of the web server 106 or messages 105 to any other generic schema defined services connected via the network 104 to the devices 100;

provide data input capabilities by the user on an input device of the devices 100 to supply data parts for Web Services' outgoing messages 105 (messages to the service) of the web server 106;

provide data presentation or output capabilities for Web Services' response messages 105 (incoming messages) or uncorrelated notifications of the web server 106 on the output device;

provide data storage services to maintain local client data in the memory module 210 (see FIG. 2) of the device 100; and provide an execution environment for a scripting language for coordinating operation of the application components 400, 402, 404, 406 (see FIG. 4) of the client application programs 302.

Figure 4:
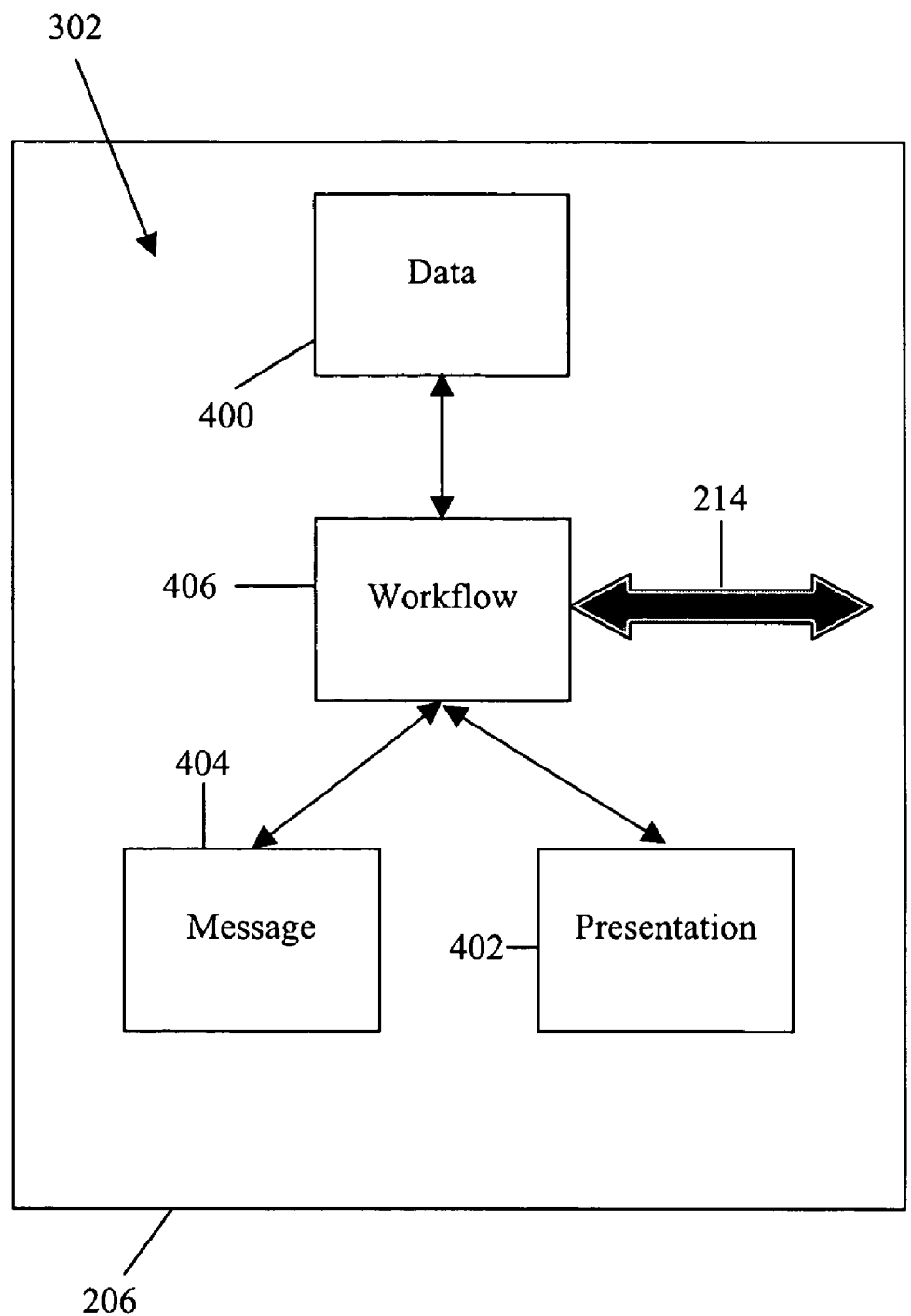
FIG. 4 is a block diagram of a component application program of FIG. 2.
Figure 4A:
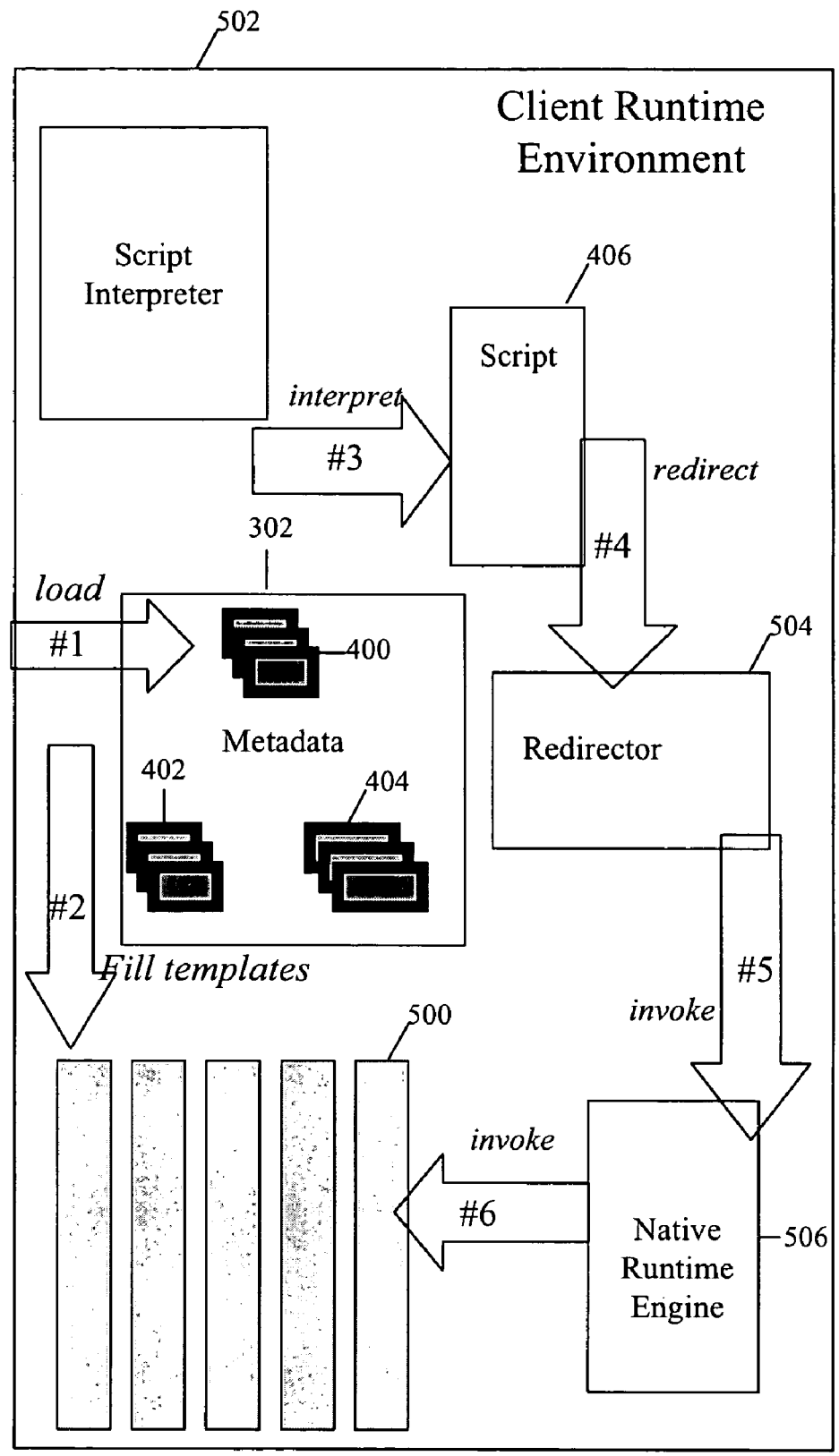
FIG. 4a shows a representative application packaging and hosting model for the system of FIG. 1.

Referring to FIGS. 2, 4 and 4a, the client runtime (for example provided by the component framework 206) loads the metadata contained in the component 400, 402, 404, 406 definitions and the builds the executable version of the application program 302 on the device 100, via an application container 300. For example, there are two operational models for client runtime: template-based native execution and metadata-based execution. With the template-based native execution model the runtime hosts data, message, and screen templates 500 pre-built on the device 100 using the native code. When the application program 302 definition is loaded, the client environment provided by the component framework 206 fills the templates 500 with metadata-defined parameters from the components 400, 402, 404 and builds the executable client application program 302 in the native format. The workflow script (for example ECMAScript) of the workflow component 406 could be either converted to native code or executed using an appropriate script interpreter 502 (e.g., ECMAScript Interpreter) to a native code redirector 504, where the redirector 504 interprets calls to the scripting language into operations on native components through a native runtime engine 506. With the metadata-based execution, the runtime environment of the component framework 206 either keeps component 400, 402, 404, 406 definitions in XML (for example), which are parsed during execution time or uses native representation of XML (for example) nodes. During execution, the native runtime engine 506 operates on definitions of the components 400, 402, 404, 406 rather than on native component entities. It is recognized that the template based approach can be more performance efficient over the metadata based execution, but can require a more sophisticated execution environment and more memory resources.

Therefore, the native client terminal runtime environment provides an interface for the client application programs 302 to the device 100 functionality of the processor 208 and associated operating system of the device infrastructure 204. The runtime environment preferably supplies a controlled, secure and stable environment on the device 100, in which the component application programs 302 execute. The runtime environment provisions the definitions of the components 400, 402, 404, 406 to create the actual web client specific for each respective device infrastructure 204 of the devices 100. It is recognized for the sake of simplicity that the following description hereafter will refer to the client runtime environment being provided by the component framework 206, as an example only.

Communication Device

Figure 9:
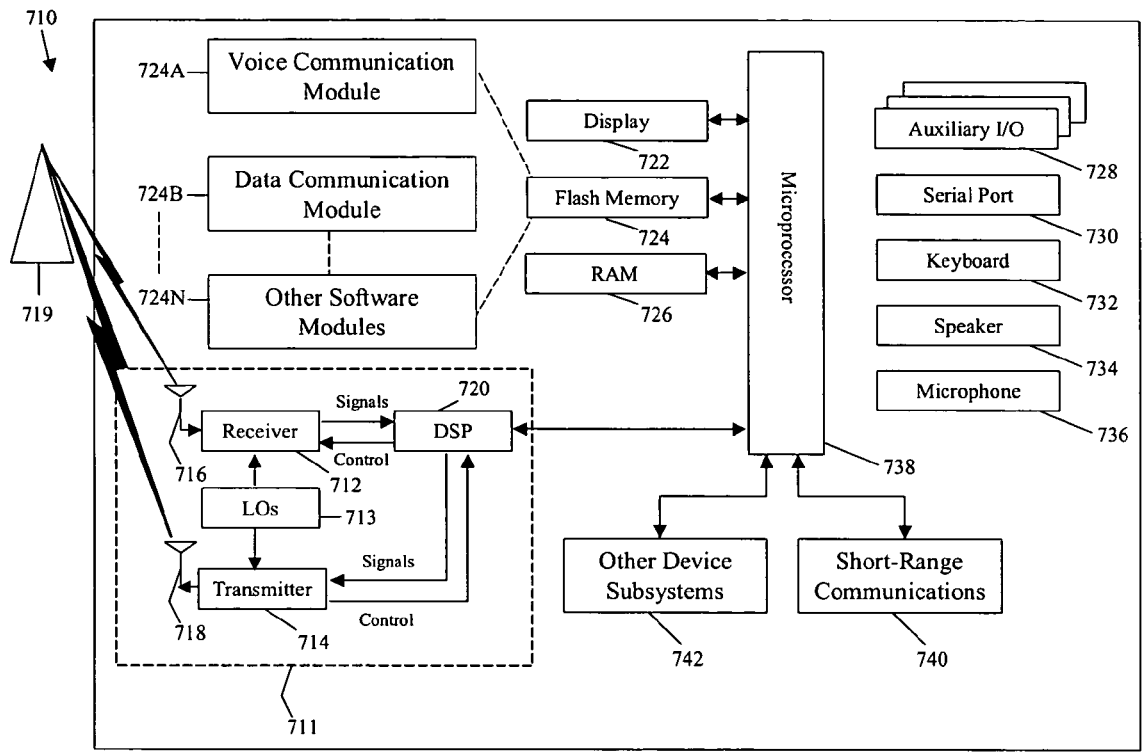
FIG. 9 is a block diagram of a further example of the device of FIG. 1.

Referring to again to FIG. 2, the devices 100 are devices such as but not limited to mobile telephones, PDAs, two-way pagers or dual-mode communication devices (see FIG. 9). The devices 100 include a network connection interface 200, such as a wireless transceiver or a wired network interface card or a modem, coupled via connection 218 to a device infrastructure 204. The connection interface 200 is connectable during operation of the devices 100 to the network 104, such as to the wireless network 102 by wireless links (e.g., RF, IR, etc.), which enables the devices 100 to communicate with each other and with external systems (such as the web server 106) via the network 104 and to coordinate the requests/response messages 105 between the client application programs 302 and the servers 106, 110 (see FIG. 1). The network 104 supports the transmission of data in the requests/response messages 105 between devices and external systems, which are connected to the network 104. The network 104 may also support voice communication for telephone calls between the devices 100 and devices which are external to the network 104. A wireless data transmission protocol can be used by the wireless network 102, such as but not limited to DataTAC, GPRS or CDMA.

Referring again to FIG. 2, the devices 100 also have a user interface 202, coupled to the device infrastructure 204 by connection 222, to interact with a user (not shown). The user interface 202 includes one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the device infrastructure 204. The user interface 202 is employed by the user of the device 100 to coordinate the requests/response message messages 105 over the system 10 (see FIG. 1) as employed by client application programs 302 of a component framework 206, further described below.

Referring again to FIG. 2, operation of the device 100 is enabled by the device infrastructure 204. The device infrastructure 204 includes the computer processor 208 and the associated memory module 210. The computer processor 208 manipulates the operation of the network interface 200, the user interface 202 and the component framework 206 of the communication device 100 by executing related instructions, which are provided by an operating system and client application programs 302 located in the memory module 210. Further, it is recognized that the device infrastructure 204 can include a computer readable storage medium 212 coupled to the processor 208 for providing instructions to the processor and/or to load/update client application programs 302 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Component Framework of Device

Referring again to FIG. 2, the component framework 206 of the device 100 is coupled to the device infrastructure 204 by the connection 220. The client runtime environment the device 100 is provided by the component framework 206, and is preferably capable of generating, hosting and executing the client application programs 302 (which are in the form of component applications—see below) from meta-data definitions. Therefore, component framework 206 provides the native client runtime environment for the client application programs 302 and is an interface to the device 100 functionality of the processor 208 and associated operating system of the device infrastructure 204. The component framework 206 provides the runtime environment by preferably supplying a controlled, secure and stable environment on the device 100, in which the component application programs 302 execute in an application container 300, for example. The application container 300 can be referred to as a smart host container for the client application program 302, and can be responsible for analyzing message meta-data (of the messages 105—see FIG. 1) and for updating the representation of the meta-data in the memory module 210.

Figure 3:
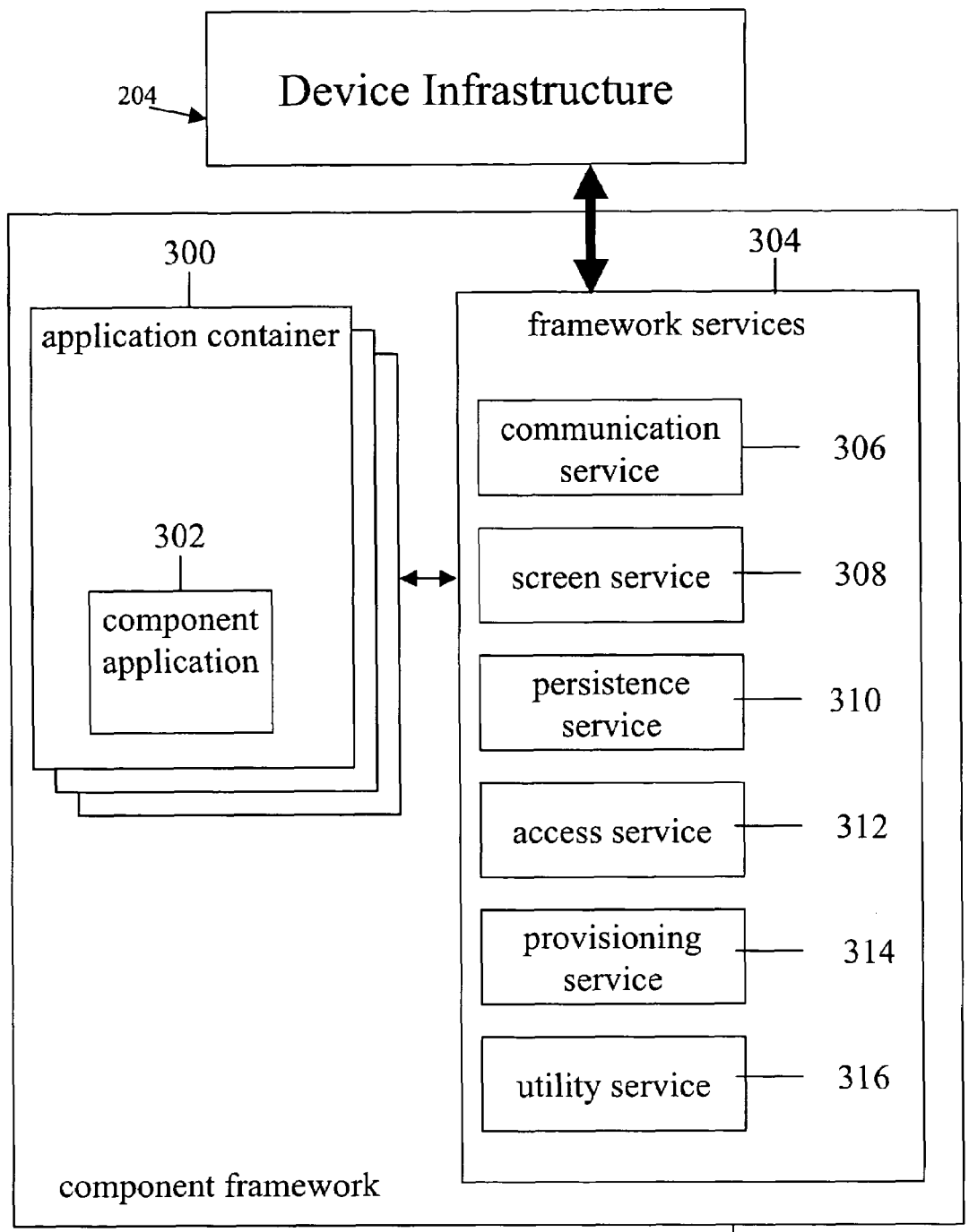
FIG. 3 is a block diagram of a component framework of the device of FIG. 2.

Referring to FIG. 3, the component framework 206 can be used to execute the client application programs 302 (such as Web Service client applications) within the terminal runtime environment and can support access to Web Service operations of the web servers 106 and associated application servers 110 (see FIG. 1), via the request/response messages 105. The component application programs 302 comprise software applications which are executed by the component framework 206. The component framework 206 creates the application container 300 for each component 400, 402, 404, 406 (see FIG. 4) of the application program 302, each time that the component application program 302 is executed. The application container 300 loads the components 400, 402, 404, 406 of the application program 302 and can create native code which is executed by the processor 208 in the device infrastructure 204. The component framework 206 therefore provides the host application containers 300 for provisioning the definitions of the components 400, 402, 404, 406 to create the actual web client specific for each respective device infrastructure 204 of the communication devices 100,116. The application container can provision the component application 302 as per the template-based native execution and metadata-based execution models as described above.

Referring again to FIG. 3, the component framework 206 can also provide framework services 304 (a standard set of generic services) to the client application programs 302, in the event certain services are not included as part of the components 400, 402, 404, 406 (see FIG. 4) or received as separate components (not shown) as part of the component application program 302. The application program 302 has communications 214 with the application container 300, which coordinates communications 216 with the framework services 304, as needed. The framework services 304 of the component framework 206 coordinate communications via the connection 220 with the device infrastructure 204. Accordingly, access to the device infrastructure 204, user interface 202 and network interface 200 is provided to the client application programs 302 by the component framework 206. In addition, the client application programs 302 can be suitably virus-resistant, since the application containers 300 can control and validate all access of the communications 214, 216 of the component framework 206 to and from the client application programs 302. It is recognized that a portion of the operating system of the device infrastructure 204 (see FIG. 2) can represent the application container 300.

Referring again to FIG. 3, the below described components 400, 402, 404, 406 (see FIG. 4) of the application program 302, once provisioned on the communication device 100,116 are given access to the predefined set of framework services 304 by the application containers 300 of the component framework 206. The framework services 304 include such as but not limited to a communication service 306, a presentation service 308, a persistence service 310, an access service 312, a provisioning service 314 and a utility service 316. The communication service 306 manages connectivity between the component application programs 302 and the external system 10, such as the messages 105 and associated data sent/received in respect to the web service (by the communication service 306) on behalf of the component applications 302. The presentation service 308 manages the representation of the component application programs 302 as they are output on the output device of the user interface 202 (see FIG. 2). The persistence service 310 allows the component application programs 302 to store data in the memory module 210 (see FIG. 2) of the device infrastructure 204. The access service 312 provides the component application programs 302 access to other software applications which are present on the communication device 100,116. The provisioning service 314 manages the provisioning of software applications on the communication device 100,116. Application provisioning can include requesting and receiving new and updated component application programs 302, configuring component application programs 302 for access to services which are accessible via the network 104, modifying the configuration of component application programs 302 and services, and removing component application programs 302 and services. The utility service 316 is used to accomplish a variety of common tasks, such as performing data manipulation in the conversion of strings to different formats.

It is recognized that the framework services 304 of the communication device 100 can provide functionality to the component application programs 302, which can include the services described above. As a result, the component application programs 302 can have access to the functionality of the communication device 100 without having to implement it. The component framework 206 of the device 100 (see FIG. 2) has only preferably one copy of the code which implements these services present in the framework services 304, regardless of the number of component application programs 302 which are present, thereby minimizing code duplication of the framework services 304. Further, unlike ordinary applications where all service requests or service API calls are programmed by developers in the native code, the component definitions 400, 402, 404 and workflow 406 describe service requests using a structured definition language such as XML and the set of instructions such as ECMAScript. The structured definition language provides a non-procedural definition of the application's user interface 202, persistent storage and communications with the Web Service, while the instructions provide the procedural component linkage. The Client runtime environment interprets these definitions 400, 402, 404 into the native calls to supported services.

Component Application Program

Referring to FIG. 2, the Web Service (for example) client application programs 302 are executed within the terminal runtime environment of the component framework 206 and support access to Web Service operations provided by the server 106 (see FIG. 1). WSDL and SOAP protocol definitions clearly imply a messages/data pattern. In a WSDL Web Service definition, the operations are defined using the notion of messages and data parts, which are used to define the Web Service client application programs 302 as a set of the related data 400 and the message 404 components (see FIG. 4).

Referring to FIG. 4, a block diagram of the component application program 302 comprises the data components 400, the presentation components 402 and the message components 404, which are coordinated by workflow components 406 through communications 214 with the application container 300. The structured definition language can be used to construct the components 400, 402, 404 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the components 400, 402, 404 to be processed by the device infrastructure 204 (see FIG. 2), and encoding schemes include such as but not limited to XML, HTML, XHTML, XSML, RDF, Machine Readable Cataloging (MARC), and Multipurpose Internet Mail Extensions (MIME).

Referring again to FIG. 4, the data components 400 define data entities which are used by the component application program 302. Examples of data entities which data components 400 may describe are orders, users, and financial transactions. Data components 400 define what information is required to describe the data entities, and in what format the information is expressed. For example, the data component 400 may define such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 400.

Since data parts (elements) are usually transferred from message 105 to message 105 according to Web Services choreography rules, preferably there is persistence of data components 400. Data components 400 may be dynamically generated according to Web Service(s) choreography definitions (if available) or defined by the application designer based on complex type definitions and/or message correlation information.

Referring again to FIG. 4, the message components 404 define the format of messages used by the component application program 302 to communicate with external systems such as the web service. For example, one of the message components 404 may describe such as but not limited to a message for placing an order which includes the unique identifier for the order, the status of the order, and notes associated with the order. Message component 404 definitions written in the structured definition language can uniquely represent (and map to) WSDL messages, and can be generated dynamically at runtime. Accordingly, the dynamic generation can be done for the component definitions for client application messages 105, and associated data content, from standard Web Service metadata in the definition language used to express the web service interface, for example such as but not limited to WSDL and BPEL. Web Services messages 105 are defined within the context of operation and there is defined correlations between the message components 404 in the component application program 302 definition. This correlation could be done using predefined message parameters and/or through separate workflow components 406, as further defined below.

Referring again to FIG. 4, the presentation components 402 define the appearance and behavior of the component application program 302 as it displayed by the user interface 202. The presentation components 402 can specify GUI screens and controls, and actions to be executed when the user interacts with the component application 302 using the user interface 202. For example, the presentation components 402 may define screens, labels, edit boxes, buttons and menus, and actions to be taken when the user types in an edit box or pushes a button. The majority of Web Service consumers use a visual presentation of Web Service operation results, and therefore provide the runtime environment on their devices 100 capable of displaying user interface screens.

Figure 4B:
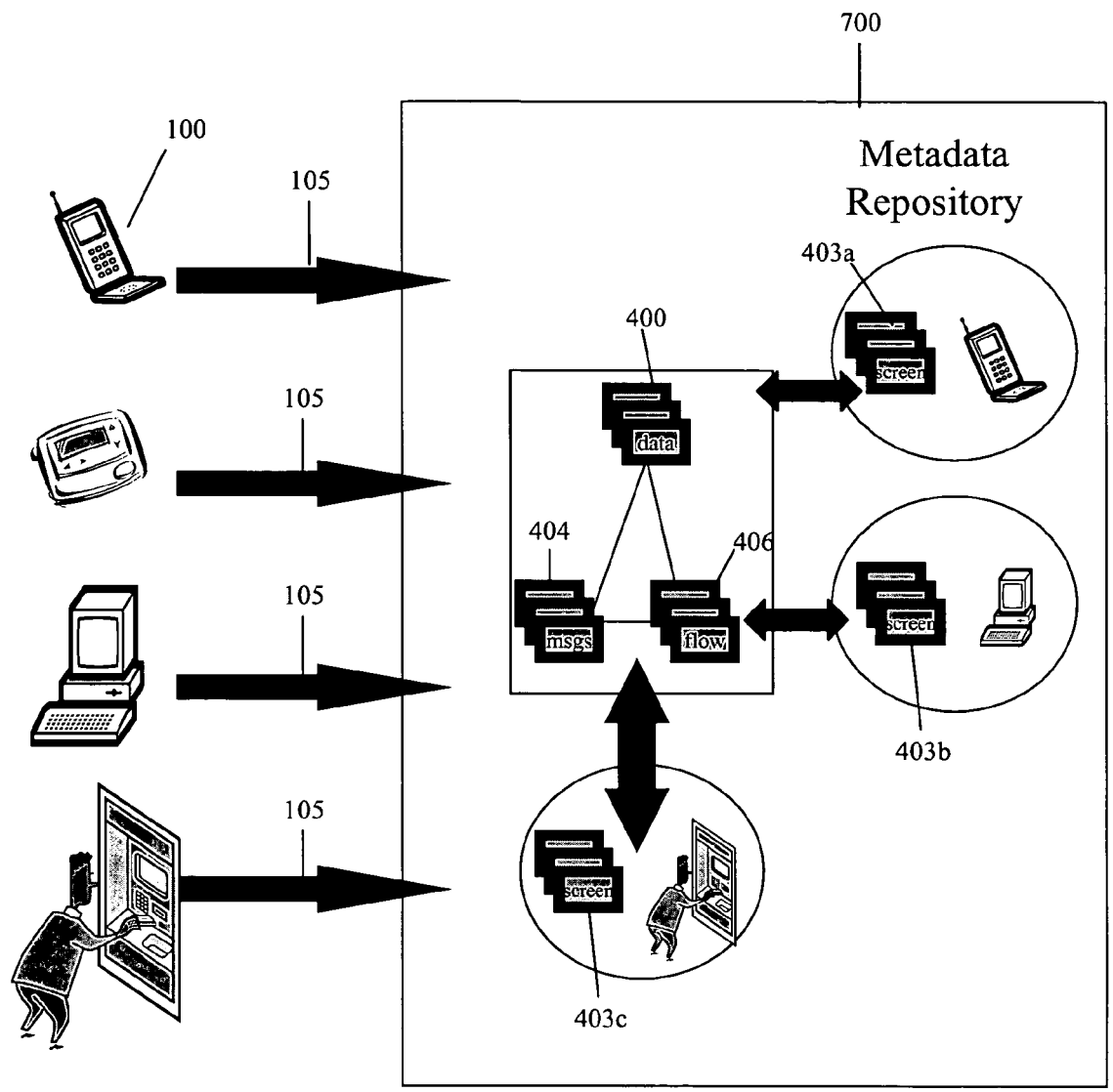
FIG. 4b is a model of a client runtime of the device of FIG. 1.

Referring to FIGS. 1, 4 and 4b, it is recognized that in the above described client component application program 302 definitions hosting model, the presentation components 402 may vary depending on the client platform and environment of the device 100. For example, in some cases Web Service consumers do not require a visual presentation. The application definition of the components 400, 402, 404, 406 of the component application program 302 can be hosted in a Web Service registry in a metadata repository 700 as a bundle of platform-neutral data 400, message 404, workflow 406 component descriptors with a set of platform-specific presentation component 402 descriptors for various predefined client runtimes (i.e. specific component frameworks 206—see FIG. 2). When the discovery or deployment request message 105 is issued the client type should be specified as a part of this request message 105. In order not to duplicate data, message, and workflow metadata while packaging component application programs 302 for different client platforms of the devices 100, application definitions can be hosted on the application server 110 (for example) as a bundle of platform-neutral component definitions linked with different sets of presentation components 403a, 403b, 403c, representing the different supported user interfaces 202 of the devices 100. It is also recognized that a standard presentation component 402 can be used in the event the specific device 100 is not explicitly supported, thereby providing at least a reduced set of presentation features. When a user makes a discovery or download request message 105, the client runtime type of the devices 100 is validated and the proper bundle is constructed for delivery by the web server 106 to the device 100 over the network 104. For those Web Service consumers, the client application programs 302 could contain selected presentation components 403a,b,c linked with the data 400 and message 404 components through the workflow components 406, thereby providing a customized component application 302.

Referring again to FIG. 4, the workflow components 406 of the component application program 302 define processing that occurs when an action is to be performed, such as an action specified by a presentation component 402 as described above, or an action to be performed when messages 105 (see FIG. 1) arrive from the system 10. Presentation workflow and message 105 processing are defined by the workflow components 406. The workflow components 406 are written as a series of instructions in a programming language or a scripting language, such as but not limited to ECMAScript, and can be compiled into native code and executed by the application container 300, as described above. An example of the workflow components 406 may be to assign values to data, manipulate screens, or send the message 105. The workflow component 406 supports a correlation between the messages 105 and defines application flow as a set of rules for operations on the other components 400, 402, 404. Multiple workflow components can be defined with respect to a given application program 302. Such additional workflow components, similar to the multiple presentation components 403a, 403b, 403c, can define differing work flows based upon different supported capabilities or feature of particular devices 100.

ECMA (European Computer Manufacturers Association) Script is a standard script language, wherein scripts can be referred to as a sequence of instructions that is interpreted or carried out by another program rather than by the computer processor. Some other example of script languages are Perl, Rexx, VBScript, JavaScript, and Tcl/Tk. The scripting languages, in general, are instructional languages that are used to manipulate, customize, and automate the facilities of an existing system, such as the devices 100. In such systems, useful functionality is already available through the user interface 202 (see FIG. 2), and the scripting language is a mechanism for exposing that functionality to program control. In this way, the device 100 is said to provide the host runtime environment of objects and facilities which completes the capabilities of the scripting language.

Specifically, EMCAScript is an object-oriented programming language for performing computations and manipulating computational objects within the host runtime environment. ECMAScript can be used as a Web scripting language, providing a mechanism to perform server 106,110 computation as part of the Web-based client-server architecture of the system 10 (see FIG. 1). ECMAScript provides core scripting capabilities for a variety of host runtime environments, and therefore the core scripting language can be considered platform neutral for a number of particular host runtime environments. The component framework 206 (see FIG. 2) can provide the ECMAScript host runtime environment for client-side computation of the devices 100, such as but not limited to; objects that represent windows, menus, pop-ups, dialog boxes, text areas, anchors, frames, history, cookies, and input/output. Further, the host runtime environment of the component framework 206 provides a means to attach scripting code to events such as but not limited to change of focus, page and image loading, unloading, error, and abort, selection, form submission, and mouse actions. The scripting code appears within the workflow components 406, combines user interface elements and fixed and computed text and images, and is reactive to user interaction on the user interface 202. The web server 106 (see FIG. 1) provides a different host environment for server-side computation including objects representing requests, clients, and files, and mechanisms to lock and share data. By using the client side and server side scripting together, it is possible to distribute computation between the client devices 100 and the servers 106,110 while providing a customized user interface 202 for the Web-based component application programs 302.

ECMAScript also defines a set of built-in operators which may not be, strictly speaking, functions or methods. ECMAScript operators include such as but not limited to various unary operations, multiplicative operators, additive operators, bitwise shift operators, relational operators, equality operators, binary bitwise operators, binary logical operators, assignment operators, and the comma operator. ECMAScript syntax resembles Java syntax, however, ECMAScript syntax is relaxed to enable it to serve as an easy-to-use scripting language for developers. For example, a variable in ECMAScript is not required to have its type declared nor are types associated with properties, and defined functions are not required to have their declarations appear textually before calls to them. It is recognized that in a class-based object-oriented programming language, in general, state is carried by instances, methods are carried by classes, and inheritance is only of structure and behavior. In ECMAScript, the state and methods are carried by objects, and structure, behavior, and state are all inherited.

Component Application Program Example

Accordingly, referring to FIG. 4, the client application programs 302 can be defined as a set of platform-neutral component definitions, namely for data 400 and message 404 components, and presentation components 402 using XML (or any other suitable structured definition language). The workflow components 406 can be defined using ECMAScript (or any other suitable platform-neutral scripting language). The client runtime environment of the component framework 206 (see FIG. 2) can generate component templates based on meta-definitions, as further described below, when the components 400, 402, 404, 406 of the component application program 302 are provisioned on the device 100. With a large variety of terminal runtime environments, the cross-platform standards such as XML or ECMAScript can be used to define application component metadata instead of pre-building the component application programs 302. This delayed binding can allow generic application definitions of the component application programs 302 to be run on a wide variety of terminal system environments, represented by various different devices 100.

Expressing the data 400, message 404, and presentation 402 components using XML or its derivatives, and the workflow component 406 using the ECMAScript language or its subset, can allow an application developer to abstract the Web Service client from any specific platform or environment and implement in principle "develop once run everywhere" applications. The following example shows how a Web Services client application program 302 could be expressed using a structured definition language, such as but not limited to XML, and a platform neutral scripting/programming language, such as but not limited to ECMAScript, defined components:

Example XML Data Components 400

```
<data name="Order">
    <item name="orderId" type="Number" key="true"/>
    <item name="items" type="String" array="true"/>
    <item name="user" comp="true" compName="User"/>
    <item name="orderStatus" type="String"/>
</data>
...
```

Example XML Message Components 404

```
<msg name="ordConfirmation" type="response" action=
"mhConfirmation">
    <part name="orderId" type="String" />
    <part name="status" type="String" />
</msg>
...
```

Example XML Presentation Components 402

```
<screen name="scrConfirmation" title="Order Confirmation" param=
"Order">
    <layout type="vertical">
    <widget type="label" value="Order Confirmation Result:"/>
        <widget type="edit" value="@Order.orderStatus"/>
</layout>
...
    <menu>
        <item label="Continue" navigate="@scrMain"/>
        ...
    </menu>
</screen>
...
```

Example ECMAScript Workflow Components 406

```
<actions>
    <function name="mhConfirmation">
        key = ordConfirmation.orderId;
        order = Order.get(key);
        order.orderStatus = ordConfirmation.status;
        scrConfirmation.display(order);
    </function>
    ...
</actions>
```

Referring to FIG. 4, as given above, it can be seen that the message components 404 relay the required data for the input and output of the messages 105. The corresponding data components 400 coordinate the storage of the data in the memory module 210 (see FIG. 2) of the device 100 for subsequent presentation on the user interface 202 (see FIG. 2) by the presentation components 402. The workflow components 406 coordinate the transfer of data between the data 400, presentation 402, and message 404 components.

There are a number of potential advantages to the component application model as described above. For example, there is a minimized need for a mediator in the service protocol between client runtime and service endpoint. Unlike browser-based applications that require a Web Server to host additional components (e.g. servlets, JSP, ASP, etc.) to connect HTML pages data/requests with a service endpoint, the component application model allows end-to-end direct connectivity between the client runtime of the device 100 and the service endpoint using Web Service (on the server 106) message component definitions.

Further, the component application model combines the simplicity of browser-based applications with the efficiency of native application execution. Unlike browser applications, rendering screens at runtime is minimized as the whole application 302 definition is downloaded preferably at once and the client runtime environment can generate a native representation of application screens. Additionally, requesting of pages (screen definitions in HTML) from the server is minimized, as the component application model architecture is based on message components 404 that contain data.

Further, the component application architecture can provide a relatively small application download size (consisting of component definitions only) as compared to hard coded native applications, and an effective data storage and persistence model. The client runtime is capable of storing and updating atomic data entities directly vs. manipulating rendered presentations such as HTML pages for browser applications.

Further, the component application architecture can provide a platform-neutral model. Unlike native applications uniquely developed for a specific client runtime, the applications 302 built using widely adopted standards such as XML and ECMAScript could be reused on a large variety of platforms and truly implement the principle "write once run everywhere". Further, the combination of non-procedural and procedural application definitions can greatly reduce programming time and effort.

Operation of Component Application Model

Figure 5:
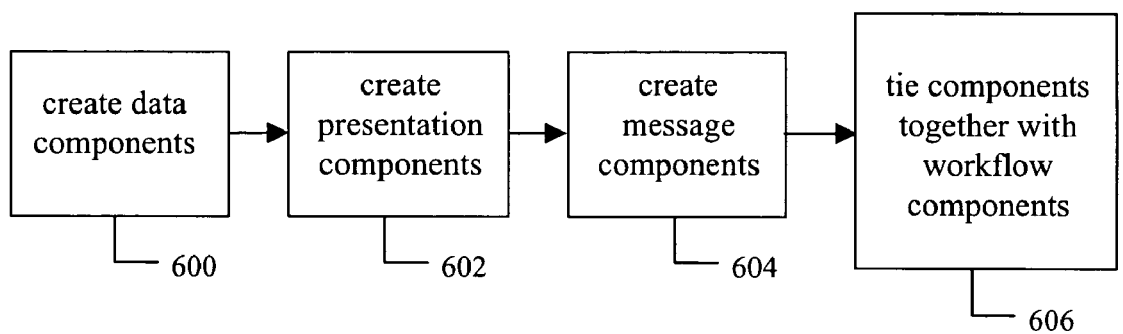
FIG. 5 is a flowchart illustrating a method of building the wireless component application of FIG. 4.

FIG. 5 is a flowchart illustrating a method of building the wireless component application 302 for subsequent communication over the network 104 to the device 100. Referring as well to FIG. 3, the method begins with step 600 of creating the data components 400 for defining data entities such as users and orders. The method continues with step 602 of creating presentation components 402 for defining user-interface elements such as screens, buttons, menus and images. The method continues with step 604 of creating message components 402 for defining messages formats which are sent to external systems such as web services on the server 106 (see FIG. 1). The components 400, 402, 404 are expressed in the structured definition language such as but not limited to one based on XML. The method concludes with step 606 of tying together the data 400, presentation 402 and message 404 components with workflow components 406 in order to define the behavior of the application 302. The workflow components 406 are written based on a scripting language such as a subset of ECMAScript, which is described above. The method of building a wireless component application 302 may include fewer or more steps that those shown in FIG. 5.

Figure 6:
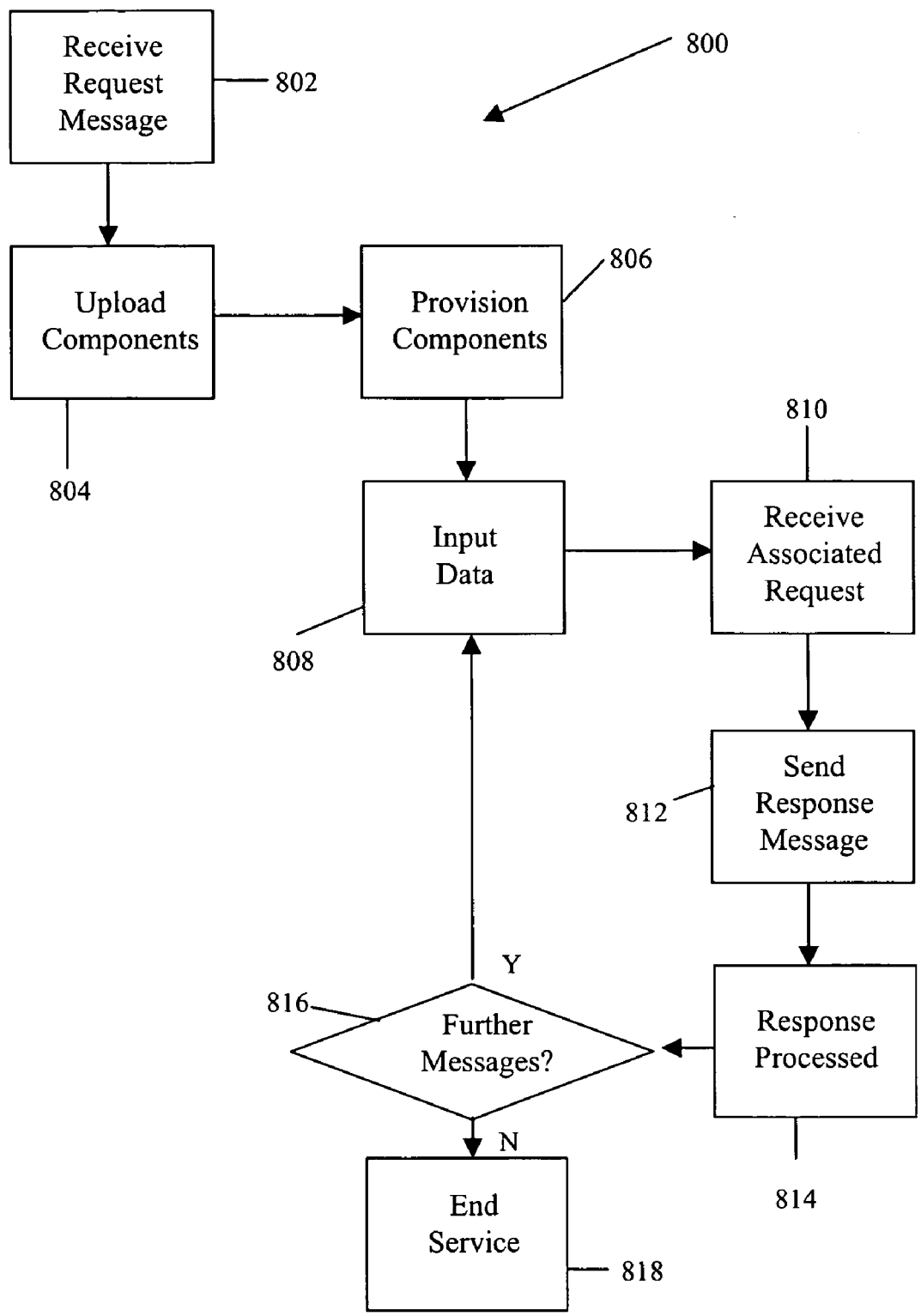
FIG. 6 is a flowchart of a method for communicating between the device and a schema defined service of FIG. 1.

Referring to FIGS. 1 and 6, operation 800 of the interaction between the devices 100 and the web service of the web server 106 is shown. The web service receives 802 the request message 105 requesting that the device 100 begin communications with the web service. The web service uploads 804 the required components 400, 402, 404, 406 (if any) of the component application 302 to the device 100, in order to support subsequent information exchange between the web service and the device 100. The device receives the transmitted component application 302 and proceeds to provision 806 the components 400, 402, 404, 406 by the runtime environment, in order to configure the device as a web client of the web service, by producing an executable version of the component application 302. The user of the device 100 inputs 808 data into the user interface 202 (see FIG. 2) of the device 100 for subsequent sending 810 to the web service as a request message 105 for receiving web service operations. The web service processes the request message 105 and sends 812 the appropriate response message 105 including data for subsequent output on the user interface 202. The device 100 receives 814 the message 105 containing the data and the executable version of the component application 302 outputs the data appropriately on the user interface 202. Further data exchange 816 is performed between the device 100 and the web service as per above, or the exchange is terminated 818 and the executable version of the component application 302 is either saved in the memory 210 (see FIG. 2) or is deleted from the runtime environment as desired.

Figure 7:
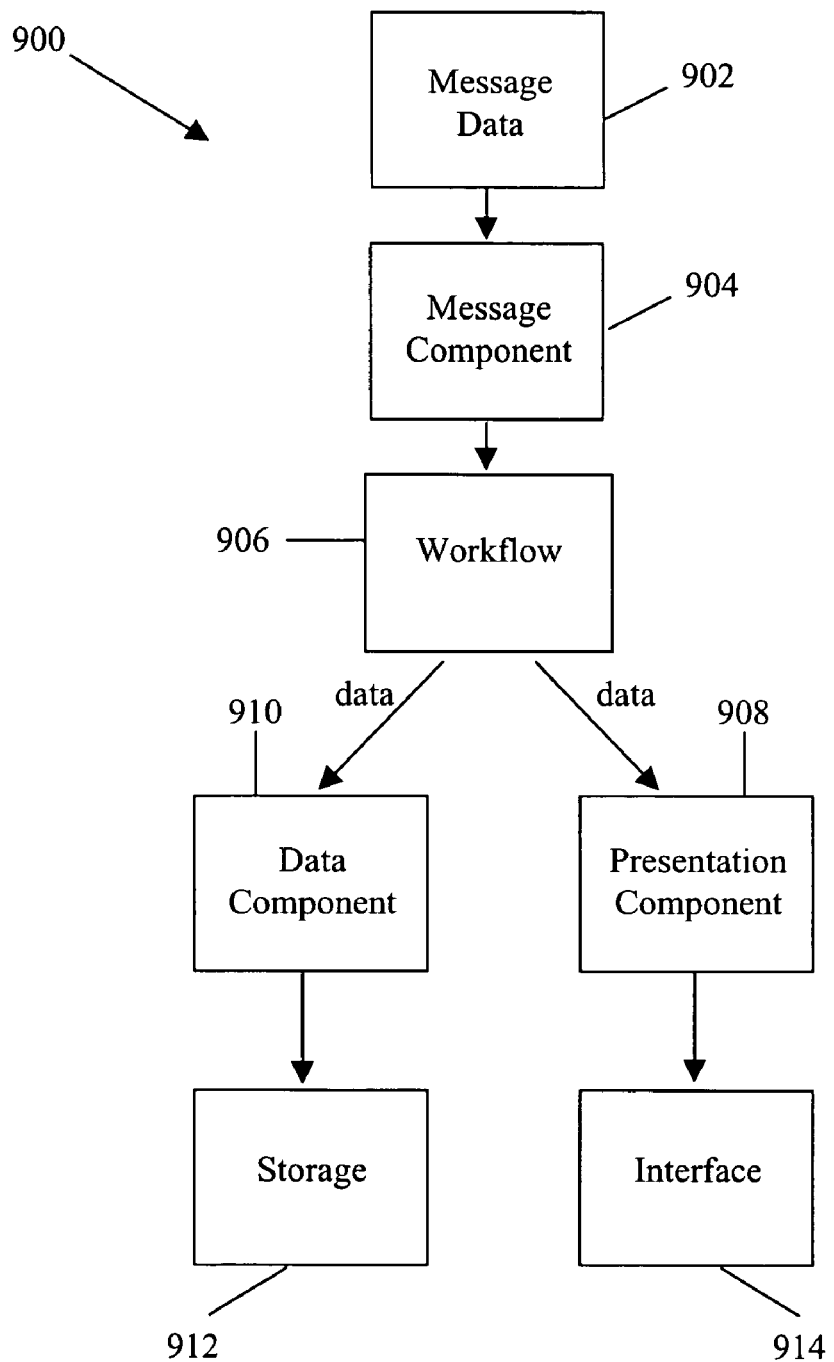
FIG. 7 shows an example method of implementing the component application program of FIG. 4.

Referring to FIGS. 1, 3 and 7, for example, operation 900 shows when the device 100 receives 902 the response message 105 containing message data, the appropriate workflow component 406 interprets 904 the data content of the message 105 according to the appropriate message component 404. The workflow component 406 then processes 906 the data content and inserts 910 the data into the corresponding data component 400 for subsequent storage 912 in the memory module 210 (see FIG. 2). Further, if needed, the workflow component 406 also inserts 908 the data into the appropriate presentation component 402 for subsequent display 914 on the user interface 202 (see FIG. 2).

Figure 8:
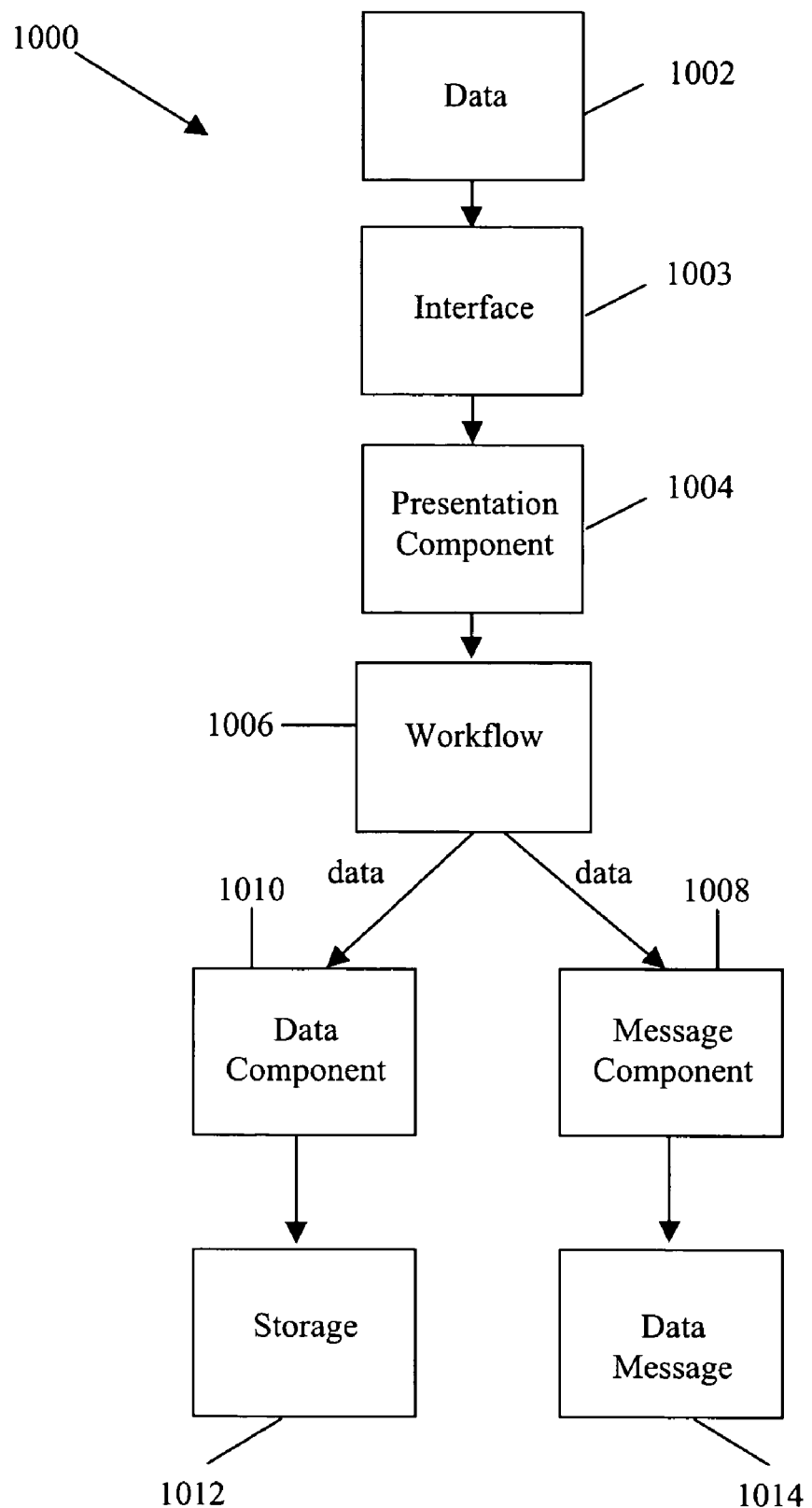
FIG. 8 shows a further example method of implementing the component application program of FIG. 4.

Referring to FIGS. 1, 3 and 8 operation 1000 shows data input 1002 for an action, such as pushing a button or selecting a menu item, which the user performed 1003 on a user-interface element through the user interface 202 (see FIG. 2). The relevant workflow component 406 interprets 1004 the input data according to the appropriate presentation component 404 and creates 1006 data entities which are defined by the appropriate data components 400. The workflow component 406 then populates 1010 the data components 400 with the input data provided by the user for subsequent storage 1012 in the memory module 210 (see FIG. 2). Further, the workflow component 406 also inserts 1008 the input data into the appropriate message component 404 for subsequent sending 1014 of the input data as data entities to the web service in the message 105, as defined by the message component 404.

It is recognized that component applications 302 which are created using the methods described above can require less time to create than hard coded applications, since the component applications 302 do not use full programming languages, but rather use standards-based technologies such as XML and ECMAScript, which are comparatively simple and easy to learn. The methods can result in component applications 302 in which the user-interface 202 and the definition of the data are decoupled. This decoupling allows for modification of any component 400, 402, 404, 406 in the component application 302 without affecting and requiring substantial changes to other components 400, 402, 404, 406 in the application 302, and thus can facilitate maintenance of the component applications 302, including modification and updating of the component applications 302 on the device 100.

FIG. 9 is a block diagram of a dual-mode mobile communication device 710, which is a further example of the device 100 of FIGS. 1 and 6. The dual-mode mobile communication device 710 includes a transceiver 711, a microprocessor 738, a display 722, Flash memory 724, RAM memory 726, auxiliary input/output (I/O) devices 728, a serial port 730, a keyboard 732, a speaker 734, a microphone 736, a short-range wireless communications sub-system 740, and may also include other device sub-systems 742. The transceiver 711 preferably includes transmit and receive antennas 716, 718, a receiver 712, a transmitter 714, one or more local oscillators 713, and a digital signal processor 720. Within the Flash memory 724, the dual-mode mobile communication device 710 preferably includes a plurality of software modules 724A-724N that can be executed by the microprocessor 738 (and/or the DSP 720), including a voice communication module 724A, a data communication module 724B, and a plurality of other operational modules 724N for carrying out a plurality of other functions.

The dual-mode mobile communication device 710 is preferably a two-way communication device having voice and data communication capabilities. Thus, for example, the dual-mode mobile communication device 710 may communicate over a voice network, such as any of the analog or digital cellular networks, and may also communicate over a data network. The voice and data networks are depicted in FIG. 9 by the communication tower 719. These voice and data networks may be separate communication networks using separate infrastructure, such as base stations, network controllers, etc., or they may be integrated into a single wireless network.

The communication subsystem 711 is used to communicate with the voice and data network 719, and includes the receiver 712, the transmitter 714, the one or more local oscillators 713 and may also include the DSP 720. The DSP 720 is used to send and receive signals to and from the transmitter 714 and receiver 712, and is also utilized to receive control information from the transmitter 714 and to provide control information to the receiver 712. If the voice and data communications occur at a single frequency, or closely-spaced set of frequencies, then a single local oscillator 713 may be used in conjunction with the transmitter 714 and receiver 712. Alternatively, if different frequencies are utilized for voice communications versus data communications, then a plurality of local oscillators 713 can be used to generate a plurality of frequencies corresponding to the voice and data networks 719. Although two antennas 716, 718 are depicted in FIG. 9, the dual-mode mobile communication device 710 could be used with a single antenna structure. Information, which includes both voice and data information, is communicated to and from the communication module 711 via a link between the DSP 720 and the microprocessor 738. The detailed design of the communication subsystem 711, such as frequency band, component selection, power level, etc., is dependent upon the communication network 719 in which the dual-mode mobile communication device 710 is intended to operate. For example, a dual-mode mobile communication device 710 intended to operate in a North American market may include a communication subsystem 711 designed to operate with the Mobitex™ or DataTAC™ mobile data communication networks and also designed to operated with any of a variety of voice communication networks, such as AMPS, TDMA, CDMA, PCS, etc., whereas a device 710 intended for use in Europe may be configured to operate with the General Packet Radio Service (GPRS) data communication network and the GSM voice communication network. Other types of data and voice networks, both separate and integrated, may also be utilized with the dual-mode mobile communication device 710.

Depending upon the type of network or networks 719, the access requirements for the dual-mode mobile communication device 710 may also vary. For example, in the Mobitex and DataTAC data networks, mobile devices are registered on the network using a unique identification number associated with each device. In GPRS data networks, however, network access is associated with a subscriber or user of a mobile device. A GPRS device typically requires a subscriber identity module ("SIM"), which is required in order to operate a dual-mode mobile communication device on a GPRS network. Local or non-network communication functions (if any) may be operable, without the SIM, but a dual-mode mobile communication device will be unable to carry out any functions involving communications over the data network 719, other than any legally required operations, such as 911 emergency calling.

After any required network registration or activation procedures have been completed, the dual-mode mobile communication device 710 may then send and receive communication signals, including both voice and data signals, over the network 719 (or networks). Signals received by the antenna 716 from the communication network 719 are routed to the receiver 712, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 720. In a similar manner, signals to be transmitted to the network 719 are processed, including modulation and encoding, for example, by the DSP 720 and are then provided to the transmitter 714 for digital to analog conversion, frequency up conversion, filtering, amplification and transmission to the communication network 719 (or networks) via the antenna 718. Although a single transceiver 711 is shown in FIG. 9 for both voice and data communications, it is possible that the dual-mode mobile communication device 710 may include two distinct transceivers, a first transceiver for transmitting and receiving voice signals, and a second transceiver for transmitting and receiving data signals.

In addition to processing the communication signals, the DSP 720 also provides for receiver and transmitter control. For example, the gain levels applied to communication signals in the receiver 712 and transmitter 714 may be adaptively controlled through automatic gain control algorithms implemented in the DSP 720. Other transceiver control algorithms could also be implemented in the DSP 720 in order to provide more sophisticated control of the transceiver 711.

The microprocessor 738 preferably manages and controls the overall operation of the dual-mode mobile communication device 710. Many types of microprocessors or microcontrollers could be used here, or, alternatively, a single DSP 720 could be used to carry out the functions of the microprocessor 738. Low-level communication functions, including at least data and voice communications, are performed through the DSP 720 in the transceiver 711. Other, high-level communication applications, such as a voice communication application 724A, and a data communication application 724B may be stored in the Flash memory 724 for execution by the microprocessor 738. For example, the voice communication module 724A may provide a high-level user interface operable to transmit and receive voice calls between the dual-mode mobile communication device 710 and a plurality of other voice devices via the network 719. Similarly, the data communication module 724B may provide a high-level user interface operable for sending and receiving data, such as e-mail messages, files, organizer information, short text messages, etc., between the dual-mode mobile communication device 710 and a plurality of other data devices via the network 719. In the dual-mode mobile communication device 710, a component framework 206 as described above may also be implemented as a software module or application, or incorporated into one of the software modules 724A-724N.

The microprocessor 738 also interacts with other dual-mode mobile communication device subsystems, such as the display 722, Flash memory 724, random access memory (RAM) 726, auxiliary input/output (I/O) subsystems 728, serial port 730, keyboard 732, speaker 734, microphone 736, a short-range communications subsystem 740 and any other dual-mode mobile communication device subsystems generally designated as 742.

Some of the subsystems shown in FIG. 9 perform communication-related functions, whereas other subsystems may provide resident or on-device functions. Notably, some subsystems, such as keyboard 732 and display 722 may be used for both communication-related functions, such as entering a text message for transmission over a data communication network, and device-resident functions such as a calculator or task list or other PDA type functions.

Operating system software used by the microprocessor 738 is preferably stored in a persistent store such as Flash memory 724. In addition to the operating system, which controls all of the low-level functions of the dual-mode mobile communication device 710, the Flash memory 724 may include a plurality of high-level software application programs, or modules, such as a voice communication module 724A, a data communication module 724B, an organizer module (not shown), or any other type of software module 724N. The Flash memory 724 also may include a file system for storing data. These modules are executed by the microprocessor 738 and provide a high-level interface between a user of the dual-mode mobile communication device and the mobile device. This interface typically includes a graphical component provided through the display 722, and an input/output component provided through the auxiliary I/O 728, keyboard 732, speaker 734, and microphone 736. The operating system, specific dual-mode mobile communication device software applications or modules, or parts thereof, may be temporarily loaded into a volatile store, such as RAM 726 for faster operation. Moreover, received communication signals may also be temporarily stored to RAM 726, before permanently writing them to a file system located in the persistent store 724.

An exemplary application module 724N that may be loaded onto the dual-mode mobile communication device 710 is a personal information manager (PIM) application providing PDA functionality, such as calendar events, appointments, and task items. This module 724N may also interact with the voice communication module 724A for managing phone calls, voice mails, etc., and may also interact with the data communication module for managing e-mail communications and other data transmissions. Alternatively, all of the functionality of the voice communication module 724A and the data communication module 724B may be integrated into the PIM module.

The Flash memory 724 preferably provides a file system to facilitate storage of PIM data items on the dual-mode mobile communication device 710. The PIM application preferably includes the ability to send and receive data items, either by itself, or in conjunction with the voice and data communication modules 724A, 724B, via the wireless network 719. The PIM data items are preferably seamlessly integrated, synchronized and updated, via the wireless network 719, with a corresponding set of data items stored or associated with a host computer system, thereby creating a mirrored system for data items associated with a particular user.

The dual-mode mobile communication device 710 may also be manually synchronized with a host system by placing the dual-mode mobile communication device 710 in an interface cradle, which couples the serial port 730 of the dual-mode mobile communication device 710 to the serial port of the host system. The serial port 730 may also be used to enable a user to set preferences through an external device or software application, or to download other application modules 724N for installation. This wired download path may be used to load an encryption key onto the dual-mode mobile communication device 710, which is a more secure method than exchanging encryption information via the wireless network 719.

Additional application modules 724N may be loaded onto the dual-mode mobile communication device 710 through the network 719, through an auxiliary I/O subsystem 728, through the serial port 730, through the short-range communications subsystem 740, or through any other suitable subsystem 742, and installed by a user in the Flash memory 724 or RAM 726. Such flexibility in application installation increases the functionality of the dual-mode mobile communication device 710 and may provide enhanced on-device functions, communication-related functions, or both. For example, secure communication applications may enable electronic commerce functions and other such financial transactions to be performed using the dual-mode mobile communication device 710.

When the dual-mode device 710 is operating in a data communication mode, a received signal, such as a text message or a web page download, will be processed by the transceiver 711 and provided to the microprocessor 738, which will preferably further process the received signal for output to the display 722, or, alternatively, to an auxiliary I/O device 728. A user of the dual-mode mobile communication device 710 may also compose data items, such as email messages, using the keyboard 732, which is preferably a complete alphanumeric keyboard laid out in the QWERTY style, although other styles of complete alphanumeric keyboards such as the known DVORAK style may also be used. User input to the dual-mode mobile communication device 710 is further enhanced with a plurality of auxiliary I/O devices 728, which may include a thumbwheel input device, a touchpad, a variety of switches, a rocker input switch, etc. The composed data items input by the user may then be transmitted over the communication network 719 via the transceiver 711.

When the dual-mode mobile communication device 710 is operating in a voice communication mode, the overall operation of the dual-mode mobile communication device 710 is substantially similar to the data mode, except that received signals are preferably be output to the speaker 734 and voice signals for transmission are generated by a microphone 736. Alternative voice or audio I/O subsystems, such as a voice message recording subsystem, may also be implemented on the dual-mode mobile communication device 710. Although voice or audio signal output is preferably accomplished primarily through the speaker 734, the display 722 may also be used to provide an indication of the identity of a calling party, the duration of a voice call, or other voice call related information. For example, the microprocessor 738, in conjunction with the voice communication module and the operating system software, may detect the caller identification information of an incoming voice call and display it on the display 722.

A short-range communications subsystem 740 is also included in the dual-mode mobile communication device 710. For example, the short-range communications subsystem 740 may include an infrared device and associated circuits and components, or a short-range wireless communication module such as a Bluetooth™ module or an 802.11 module to provide for communication with similarly-enabled systems and devices. Those skilled in the art will appreciate that "Bluetooth" and 802.11 refer to sets of specifications, available from the Institute of Electrical and Electronics Engineers (IEEE), relating to wireless personal area networks and wireless LANs, respectively.

Although the disclosure herein has been drawn to one or more exemplary systems and methods, many variations will be apparent to those knowledgeable in the field, and such variations are within the scope of the application. For example, although XML and a subset of ECMAScript are used in the examples provided, other languages and language variants may be used to define component applications 302.

We claim:

1. A method of interacting with a schema-defined service by a terminal device over a network, the method comprising:
   sending a request network message for establishing communication between the service and the terminal device;
   receiving in response to the request network message a component application program comprising a plurality of components, a first set of the components having metadata descriptors expressed in a structured definition language defining configuration information of the component application program and a second set of the components being expressed as a series of scripted instructions coupled to the metadata descriptors defining a workflow of the component application program the workflow comprising a workflow component for defining an action to be performed when messages arrive at the terminal device, the components being configured for provisioning by a runtime environment of the terminal device, the runtime environment using a template-based execution model or a metadata-based execution model, to produce an executable version of the component application program configuring the terminal device as a client of the service;
   wherein the execution of the executable version facilitates a subsequent exchange of data over the network between the service and the terminal device.

2. The method according to claim 1, wherein the runtime environment provides an interface for the executable version to the functionality of a processor and an associated operating system of an infrastructure of the device.

3. The method according to claim 2, wherein the runtime environment is configured for implementing capabilities comprising any of; provide communications for sending a network message to the service, provide data input by a user of the device for supplying data content for a network message associated with the service, provide data presentation in response to a network message associated with the service, provide data storage services for maintaining local client data in a memory of the device, and/or provide an execution environment for a programming language for coordinating operation of the components in the executable version.

4. The method according to claim 2, wherein the runtime environment is configured as a portion of the operating system.

5. The method according to claim 2, further comprising the step of dynamically generating the component descriptors for client application messages and associated data from metadata defined for the service.

6. The method according to claim 5, wherein the service is a generic schema-defined service comprising; a web service, a database service, or a IDL based CORBA service.

7. The method according to claim 2, further comprising the step of comprising a data component in the first set of component definitions, the data components for describing a format of the data entities used by the program.

8. The method according to claim 7, further comprising the step of comprising at least one message component in the first set of component definitions, each message component describing a format of the messages used by the program to communicate over the network with the service.

9. The method according to claim 8, wherein the data component definitions and message component definitions are platform neutral for accommodating a variety of different runtime environments.

10. The method according to claim 8, further comprising the step of comprising a presentation component in the first set of components, the presentation components for defining the appearance and behavior of the component application program as presented on a user interface of the device.

11. The method according to claim 10, further comprising the step of specifying a client type of the device in the request network message for providing the presentation component as platform specific for a predefined runtime environment.

12. The method according to claim 10, wherein the workflow component in the second set of components defines processing that occurs when an action is to be performed as specified by one of the first set of components.

13. The method according to claim 12, further comprising the step of sending a network message initiated by interaction of a user of the device with a user interface element, the network message comprising data entities created by the workflow component corresponding to the user interface element.

14. The method according to claim 13, wherein the network message is configured according to the message component for comprising the data entities based on the structured definition language.

15. The method according to claim 14, further comprising the step of receiving a response network message comprising message data related to the data entities, the response network message configured for subsequent presentation of the message data on a user interface of the device, wherein the message data is formatted based on the structured definition language.

16. The method according to claim 15, wherein the device comprises any of; a personal computer, a wireless device, a PDA, a self-service kiosk, and/or a desktop terminal.

17. The method according to claim 12, wherein the workflow component defines application flow through a set of rules for operations on the first set of components.

18. The method according to claim 8, wherein each message component uniquely maps to a message described by the schema-definition of the service.

19. The method according to claim 7, wherein the workflow component supports a correlation between messages.

20. The method according to claim 2, further comprising the step of executing the executable version in native code by the template based execution model, the model employing a number of predefined templates configured for populating with the metadata descriptors of the components, wherein the predefined templates are provided for the plurality of components comprising any of; data components, message components, and/or presentation components.

21. The method according to claim 20, further comprising the step of populating the predefined templates with metadata defined parameters associated with the metadata descriptors and using the populated templates for building the executable version in the native code.

22. The method according to claim 2, further comprising the step of executing the executable version by the metadata based execution model, the model configured for keeping the metadata definitions in the structured definition language for parsing during execution.

23. The method according to claim 2, further comprising the step of executing the executable version by the metadata based execution model, the model configured for using a native representation of structured definition language nodes during execution.

24. The method according to claim 2 wherein the runtime environment is provided by a component framework providing a set of common services to component applications.

25. The method according to claim 24, wherein the set of common services include one or more of:
a communication service;
a presentation service;
a persistence service;
an access service;
a provisioning service; and
an utility service.

26. The method according claim 2, wherein the executable version of the component application executes in an application container, which is a part of component framework.

27. A terminal device configured for interacting over a network with a schema based service using an executable version of a component application program comprising a plurality of components, the terminal device comprising:
a device infrastructure for operating the terminal device comprising a processor and an associated memory for executing the executable version;
a user interface coupled to the device infrastructure having an input device and an output device configured for communication with the executable version;
a network connection interface coupled to the device infrastructure and configured for communicating with the network; and
a runtime environment for processing the component application program to generate the executable version. using a template-based execution model or a metadata-based execution model, for configuring the device as a client of the service, the runtime environment configured for processing a first set of the components having metadata descriptors expressed in a structured definition language for defining configuration information of the component application program and a second set of the components being expressed as a series of scripted instructions coupled to the metadata descriptors for defining a workflow of the component application program, the workflow component defining an action to be performed when messages arrive at the terminal device;
wherein the execution of the executable version facilitates a subsequent exchange of data over the network between the service and the terminal device.

28. The terminal device according to claim 27, wherein the runtime environment provides an interface for the executable version to the functionality of the processor and an associated operating system of the infrastructure of the device.

29. The terminal device according to claim 28, wherein the runtime environment is configured for implementing capabilities comprising any of; provide communications for sending a network message to the service, provide data input by a user of the device for supplying data content for a network message associated with the service, provide data presentation in response to a network message associated with the service, provide data storage services for maintaining local client data in a memory of the device, and/or provide an execution environment for a programming language for coordinating operation of the components in the executable version.

30. The terminal device according to claim 28, wherein the runtime environment is configured as a portion of the operating system.

31. The terminal device according to claim 28, wherein the component descriptors are dynamically generated for client application messages and associated data from metadata defined for the service.

32. The terminal device according to claim 31, wherein the service is a generic schema-defined service comprising; a web service, a database service, or a IDL based CORBA service.

33. The terminal device according to claim 28, further comprising a data component in the first set of component definitions, the data component for describing a format of the data entities used by the program.

34. The terminal device according to claim 33, further comprising at least one message component in the first set of component definitions, each message component of the at least one message components for describing a format of the messages used by the program to communicate over the network with the service.

35. The terminal device according to claim 34, wherein the data component definitions and message component definitions are platform neutral for accommodating a variety of different runtime environments.

36. The terminal device according to claim 34, further comprising a presentation component in the first set of components, the presentation component for defining the appearance of the component application program as presented on a user interface of the device.

37. The terminal device according to claim 36, wherein a client type of the device specified in the request network message provides for the presentation component as platform specific for a predefined runtime environment.

38. The terminal device according to claim 36, wherein the workflow component defines processing that occurs when an action is to be performed as specified by one of the first set of components.

39. The terminal device according to claim 38, wherein the workflow component supports a correlation between messages.

40. The terminal device according to claim 38, wherein the workflow component defines application flow through a set of rules for operations on the first set of components.

41. The terminal device according to claim 40, wherein the executable version is configured for sending a network message initiated by interaction of a user of the device with a user interface element, the network message comprising data entities created by the workflow component corresponding to the user interface element.

42. The terminal device according to claim 41, wherein the network message is configured according to the message component for comprising the data entities based on the structured definition language.

43. The terminal device according to claim 42, wherein the executable version is configured for receiving a response network message comprising message data related to the data entities, the response network message configured for subsequent presentation of the message data on a user interface of the device, wherein the message data is formatted based on the structured definition language.

44. The terminal device according to claim 43, wherein the device comprises any of; a personal computer, a wireless device, a PDA, a self-service kiosk, and/or a desktop terminal.

45. The terminal device according to claim 34, wherein each message component of the at least one message components uniquely maps to a message described by the schema-definition of the service.

46. The terminal device according to claim 38, wherein the template based execution model is used for executing the executable version in native code, the model employing a number of predefined templates configured for populating with the metadata descriptors of the components, wherein the predefined templates are provided for the plurality of components comprising any of; data components, message components, and/or presentation components.

47. The terminal device according to claim 46, wherein the predefined templates are populated with metadata defined parameters associated with the metadata descriptors using the populated templates for building the executable version in the native code.

48. The terminal device according to claim 38, wherein the metadata based execution model is used for executing the executable version, the model configured for keeping the metadata definitions in the structured definition language for parsing during execution.

49. The terminal device according to claim 38, wherein the metadata based execution model is used for executing the executable version, the model configured for using a native representation of structured definition language nodes during execution.

50. The terminal device according to claim 28, wherein the runtime environment is provided by a component frame-work providing a set of common services to component applications.

51. The terminal device according to claim 28, wherein the executable version of the component application executes in an application container, which is part of the component frame-work.

52. The terminal device according to claim 51, wherein the application container is responsible for one or more of:
   a communication service;
   a presentation service;
   a persistence service;
   an access service;
   a provisioning service; and
   an utility service.

53. A computer program product for configuring a terminal device for interacting over a network with a schema-based service using an executable version of a component application including a plurality of components, the computer program product comprising:
   a computer readable medium;
   a runtime environment module stored on the computer readable medium for coordinating execution of the executable version for configuring the device as a client of the service, the runtime environment configured for interaction with a first set of the components having metadata descriptors expressed in a structured definition language for defining configuration information of the component application program and a second set of the components being expressed as a series of scripted instructions coupled to the metadata descriptors for defining a workflow of the component application program, the workflow comprising a workflow component for defining an action to be performed when messages arrive at the terminal device, the components being configured for provisioning by a runtime environment of the device, the runtime environment using a template-based execution model or a metadata-based execution model, to produce an executable version of the component application program configuring the device as a client of the service;
   wherein the execution of the executable version facilitates a subsequent exchange of data over the network between the service and the device.

54. A server configured for providing a schema-based service for interacting with a terminal device over a network, the server comprising:
   a network interface for receiving a request network message to establish communication between the service and the device;
   a component application program coupled to the network interface for sending in response to the request network message, the component application program including a plurality of components, a first set of the components having metadata descriptors expressed in a structured definition language for defining configuration information of the component application program and a second set of the components being expressed as a series of scripted instructions coupled to the metadata descriptors for defining a workflow of the component application program, the workflow-comprising a workflow component for defining an action to be performed when messages arrive at the terminal device, the components being configured for provisioning by a runtime environment of the device, the runtime environment using a template-based execution model or a metadata-based execution model, to produce an executable version of the component application program configuring the device as a client of the service;
   wherein the execution of the executable version facilitates a subsequent exchange of data over the network between the service and the device.

55. A terminal device configured for interacting over a network with a schema-based service using an executable version of a component application program including a plurality of components, the device comprising;
   an infrastructure means for operating the device to execute the executable version;
   a user interface means coupled to the infrastructure means configured for communication with the executable version;
   a network interface coupled to the device infrastructure and configured for communicating with the network; and
   a runtime means for coordinating execution of the executable version for configuring the device as a client of the service, the runtime means configured for interaction with a first set of the components having metadata descriptors expressed in a structured definition language for defining configuration information of the component application program and a second set of the components being expressed as a series of scripted instructions coupled to the metadata descriptors for defining a workflow of the component application program, the workflow-comprising a workflow component for defining an action to be performed when messages arrive at the terminal device, the components being configured for provisioning by a runtime environment of the device, the runtime environment using a template-based execution model or a metadata-based execution model, to produce an executable version of the component application program configuring the device as a client of the service;
   wherein the execution of the executable version facilitates a subsequent exchange of data over the network between the service and the device.

\* \* \* \* \*